United States Patent [19]

McInturff

[11] 4,024,737
[45] May 24, 1977

[54] LOCKABLE MOUNTING MEANS FOR REMOVEABLY SUPPORTING ELECTRONIC ACCESSORIES IN VEHICLES

[76] Inventor: Carol Edward McInturff, P.O. Box 3576, Tempe, Ariz. 85257

[22] Filed: June 14, 1976

[21] Appl. No.: 695,523

[52] U.S. Cl. .............................. 70/58; 70/DIG. 57
[51] Int. Cl.² ...................................... E05B 73/00
[58] Field of Search .............. 70/58, 258, DIG. 57, 70/57, 18, 229–232; 248/203

[56] References Cited
UNITED STATES PATENTS

| | | | |
|---|---|---|---|
| 3,410,122 | 11/1968 | Moses | 70/58 |
| 3,673,828 | 7/1972 | Jones | 70/58 |
| 3,822,049 | 7/1974 | Saunders | 248/203 |
| 3,945,227 | 3/1976 | Reiland | 70/58 |

Primary Examiner—Robert L. Wolfe
Attorney, Agent, or Firm—Wm. H. Dean

[57] ABSTRACT

The disclosure relates to a lockable mounting means for removeably supporting electronic accessories in vehicles and primarily citizen band receivers and transmitters, as well as stereo transcribers or the like. The aforementioned mounting means is provided with a telescopic mount, one portion of the telescopic mount being mounted in the vehicle and the other being secured to the electronic accessory, such that the telescopic members may be locked together or unlocked by a suitable key operated tumbler mechanism so that the electronic accessory may be removed from a vehicle temporarily to prevent theft when the operator of the vehicle is not present. The disclosure also relates to novel L-shaped bracket mechanism for mounting the electronic accessory to one of the aforementioned telescopic members.

12 Claims, 9 Drawing Figures

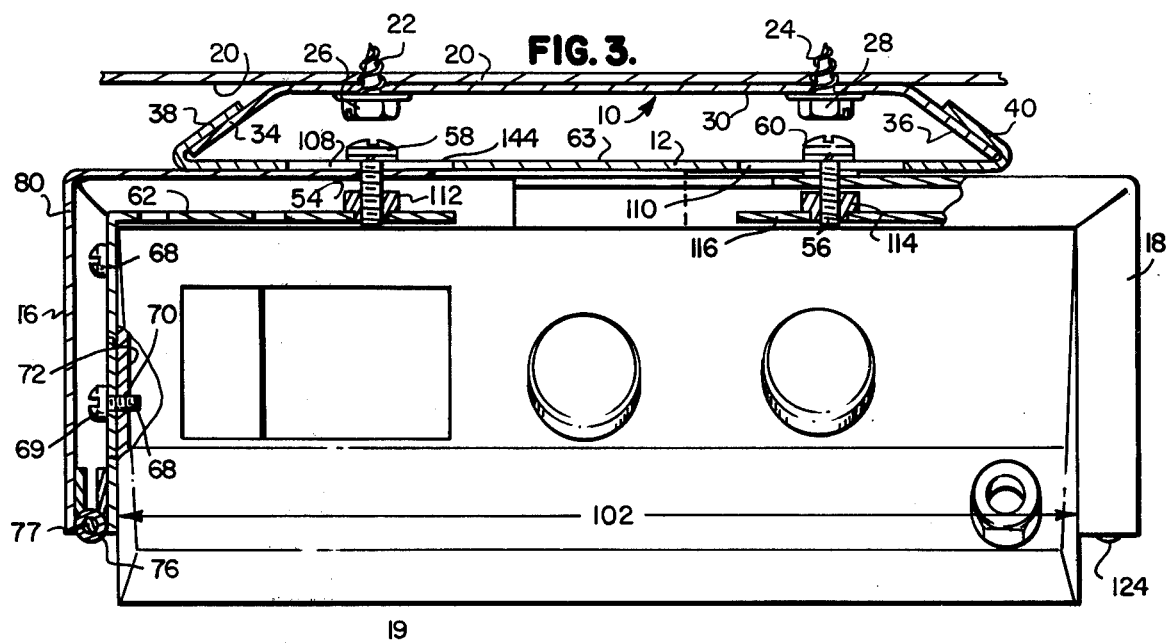
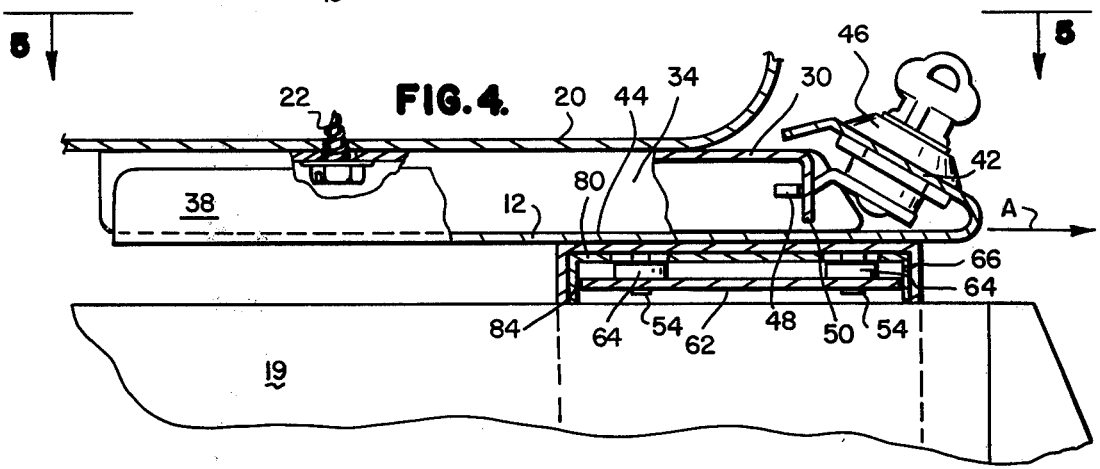
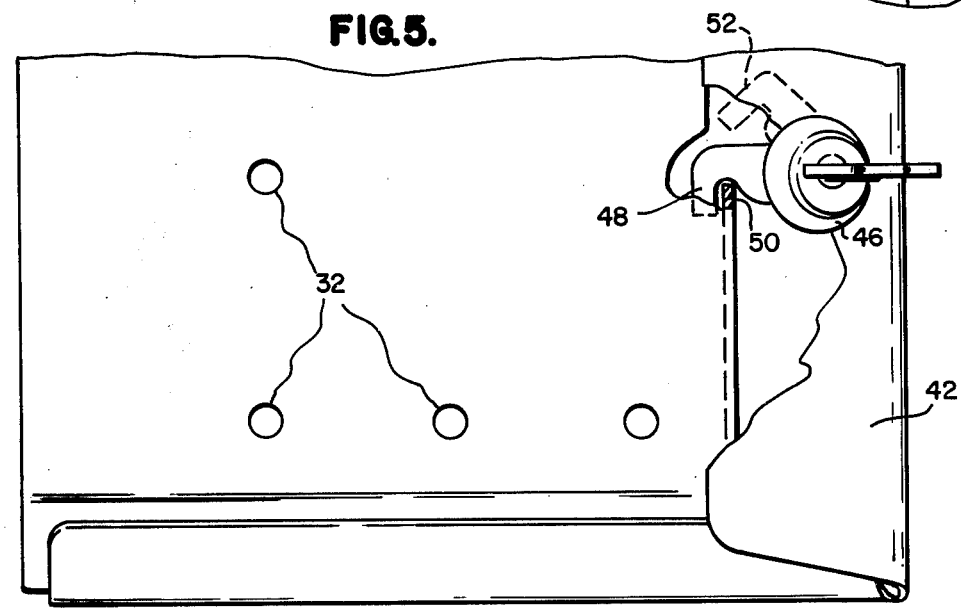

U.S. Patent  May 24, 1977  Sheet 3 of 3  4,024,737
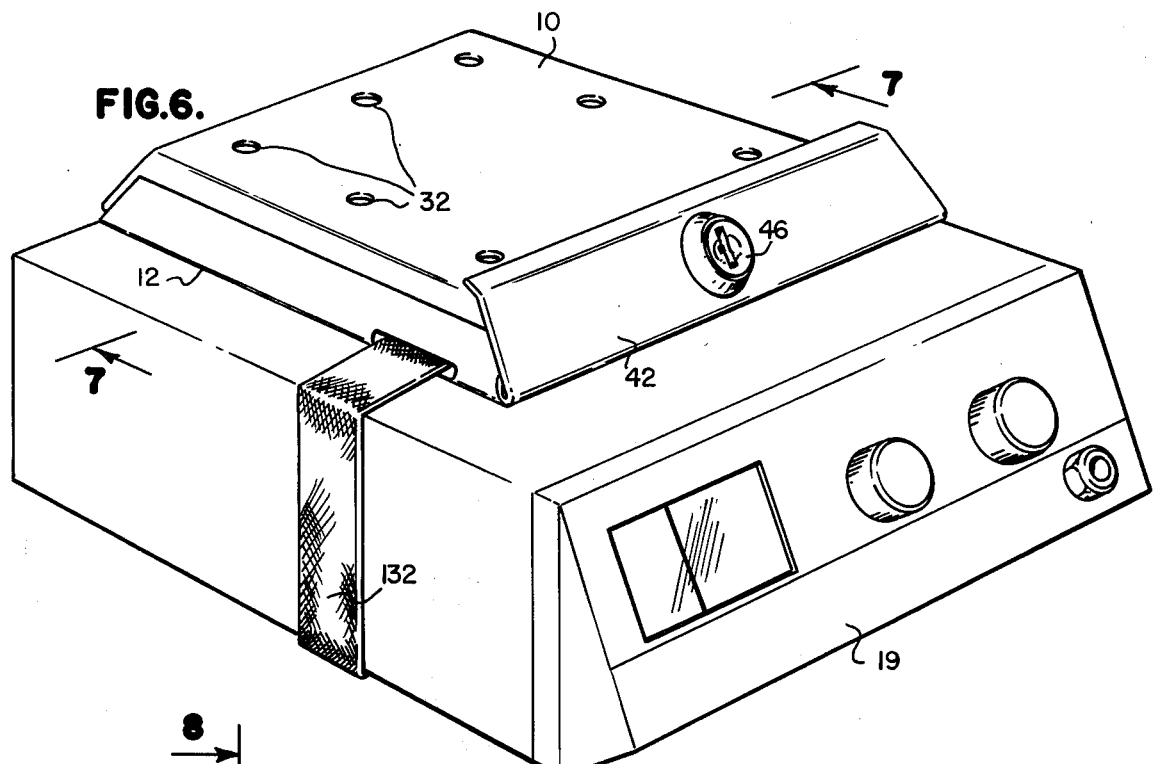
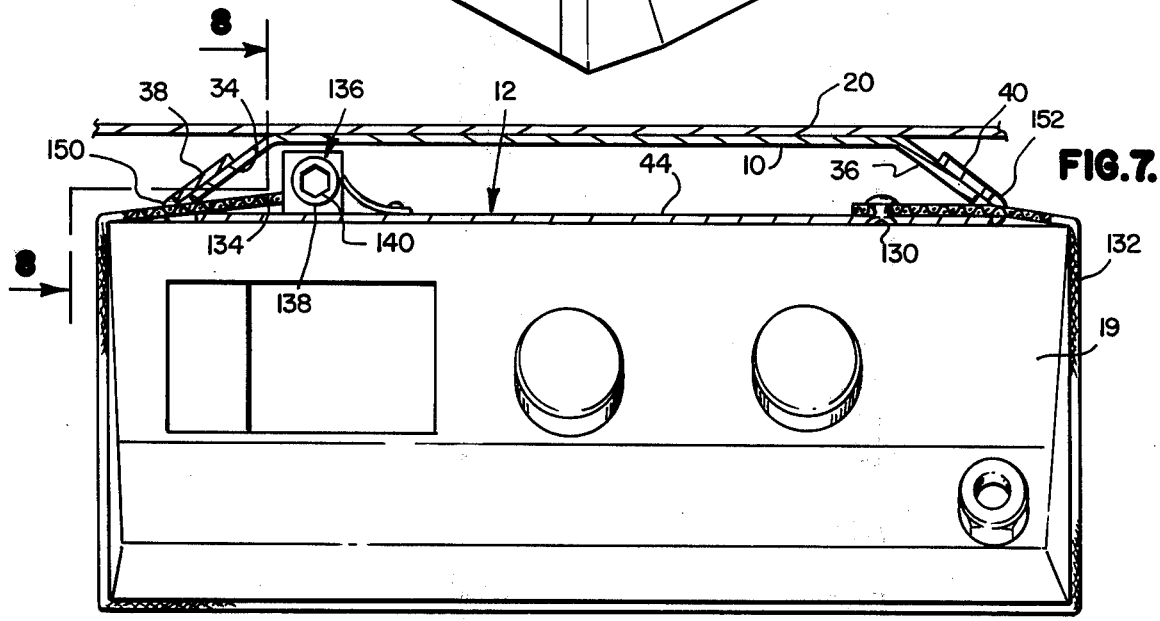
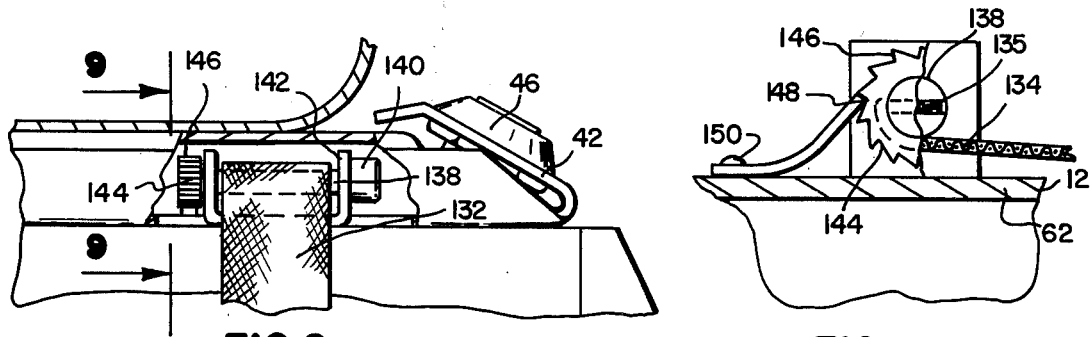

LOCKABLE MOUNTING MEANS FOR REMOVEABLY SUPPORTING ELECTRONIC ACCESSORIES IN VEHICLES

BACKGROUND OF THE INVENTION

Various CB electronic acessories, as well as stereo transcribers, have been the popular items in autobobiles which have been stolen, and it has been a problem to mount such accessories in vehicles in such a manner that they cannot be stolen and this has proved to be almost impossible. Therefore, it has been recognized that a suitable means may be provided for lockably mounting such accessories in vehicles such that they may be removeably supported therein and whereby the accessories may be unlocked and removed from the vehicle to prevent theft thereof. The prior art contains various attempts at the solution to the foregoing problems. However, some of the lockable mechanisms have been vulnerable to simple and easy removal of electronic accessories held thereby and have therefore have not been entirely satisfactory. Furthermore, the means by which such accessories have been mounted in vehicles has been inconvenient and, in many instances, exposes removeably fasteners which allow a thief to readily remove the electronic accessors from the lockable mount. Furthermore, various devices for supporting such electronic accessories have been inconvenient due to the fact that they are not readily adapted to fit various sized frames or housings of such electronic accessories.

SUMMARY OF THE INVENTION

The present invention comprises a lockable mounting means for removably supporting electronic accessories in vehicles and particular such accessories as CB radio transmitters and receivers, as well as stereo transcribers or the like.

The removeably supporting means for electronic accessories comprises a pair of telescopic members removeably connected together by a conventional tumbler lock operable by a key; one of the telescopic members being fixed to the structure of the vehicle and preferably an area around the instrument panel or the like, while the other of the telescopic members is secured to a mounting means adapted to be mounted on and fixed to any one of a variety of housings containing an electronic accessory of the type hereinbefore referred to. The cross sectional shape of the telescopic members is frusto pyramidal and has flat portions such that the one telescopic member is readily mountable on a flat surface of a vehicle and the other telescopic member is readily mountable in connection with generally L-shaped bracket assemblies which are secureable to said housings of various electronic accessories.

The L-shaped bracket assemblies comprise a pair of assemblies; each assembly being provided with a pair of generally L-shaped bracket portions hinged together and such that the first of the L-shaped portions of each bracket assembly are secureable to an electronic accessory housings and each of the bracket assemblies having a second L-shaped member which is generally channel shaped in cross section having an intermediate web and a pair of spaced apart flanges. The flanges and the web are adapted to cover fixtures extending through the L-shaped bracket member secured to the accessory housing and the web and flanges of the outermost hinged L-shaped member cover the fixtures extending through the L-shaped member secured to the accessory housing in such a manner that all of the fixtures are enclosed and the hinges, which interconnect the L-shaped members of each bracket assembly, are enclosed in the channel shaped portions of the outermost L-shaped members and between the flanges thereof so that access to the hinge pins is prevented.

The fixtures which connect the accessory housing to the L-shaped bracket assemblies are hidden in the frusto pyramidal cross section of the aforementioned telescopic members such that access to these fixtures cannot be attained when the telescopic members are locked together by the lockable key operated tumbler mechanism in connection with the telescopic member coupled to the L-shaped bracket assemblies.

The last mentioned telescopic member, which is connected to the L-shaped bracket assemblies, is connected thereto by fixtures positioned on the inside of the last mentioned telescopic member and covered by the telescopic member secured to the vehicle. The telescopic member carryig the L-shaped bracket assemblies and the electronic accessory housing has an end flange or panel which carries the tumbler lock of the mechanism and this panel covers the open end portions of the telescopic members so as to prevent access to the fixtures and close therein and which secure the L-shaped bracket assemblies to the telescopic member carrying the tumbler lock which is adapted to lock to the telescopic member fixed to the vehicle body or instrument panel structure.

The aforementioned L-shaped bracket assemblies are provided with telescopic overlapping portions which are adapted to fit over an electronic accessory housing such that the overlapping portions of the L-shaped bracket assemblies are telescopic relative to each other and are therefore adapted to span the width of said housing, whether it be of a maximum or a minimum dimension depending upon the conventional housings in which such electronic assemblies are carried.

Additionally, slotted fixture openings are provided in the L-shaped bracket assemblies so that fixtures for connecting them to one of the aforementioned telescopic members may be readily utilized, even though the dimensions of the respective electronic accessory housing varies.

The invention also comprises a novel modification employing frusto pyramidal telescopic members which are lockable together and wherein a flexible tension band is secured to the readily removable telescopic member and is adapted to surround an electronic accessory housing and take up means is provided for the bands such that it may be very tightly tensioned around said housing for holding it securely in connection with the removeable telescopic member which carries the tumbler locking mechanism as hereinbefore referred to. The take up mechanism for the band, which surrounds the electronic accessory housing, comprises a mandrel and ratchet wheel mechanism which permits the mandrel to be tightened and the ratchet wheel automatically locked as the band is tightened so as to provide a very simple and efficient means by which the band may be securely frictionally and tightly engaged with the housing.

Accordingly, it is an object of the present invention to provide a lockable mounting means for removeably supporting electronic accessories in vehicles wherein means is provided for removeably locking an electronic accessory, such as a CB radio or a stereo transcriber, in a vehicle and such that it may be readily unlocked and removed to prevent theft thereof.

Another object of the invention is to provide a lockable mounting means for removeably supporting electronic accessories in vehicles wherein a pair of telescopic members and L-shaped bracket assemblies support an electronic accessory in a vehicle in such a manner that the fixtures securing the lockable mounting means in the vehicle and the lockable mounting means relative to the accessory housing are totally covered and inaccessable to a person who might attempt to remove the mounting means from the vehicle or to remove the electronic accessory housing from the mounting means.

Another object of the invention is to provide a novel combination of a pair of telescopically related frusto pyramidal members and a pair of L-shaped bracket assemblies which may readily be utilized to mount electronic accessory housings of various sizes and wherein the bracket assemblies are each provided with a pair of generally L-shaped parts adapted to nest together and which are hinged together such that one of the L-shaped members of each assembly is channel shaped in cross section and provides a cover for fixtures extending into the secondary housing and the hinged relationship of the L-shaped members of each assembly being provided by hinge having its opposite ends and its hinge pin enclosed by the channel shaped L-shaped member and its flanges whereby all of the fixtures and the hinge which relate to the accessory housing are covered and tamper proof.

Another object of the invention is to provide a novel combination of telescopic members which are generally frusto pyramidal and which enclosed the fixtures utilized to secure one of the telescopic members to L-shaped bracket assemblies which are coupled to an electronic accessory housing such that all of the fixtures used for securing the electronic accessory housing in a vehicle are covered and are therefore not readily engaged by wrenches or other tools for removal thereof when the telescopic members are locked together by a tumbler lock assembly carried by one of the telescopic members.

Another object of the invention is to provide a very simple economical durable and safe lockable mounting means for removeably supporting electronic accessories in vehicles.

Another object of the invention is to provide a lockable mounting means for removeably supporting electronic accessories in vehicles which is readily adapted to mount various sized housings and which has compact neat structure easily connected to electronic accessory housings and easily mountable in a vehicle.

Further objects and advantages of the invention may be apparent from the following specification, appended claims and accompanying drawings.

BRIEF DESCRIPTION OF THE DRAWINGS

FIG. 3 is a fragmentary sectional view taken from the line 3—3 of FIG. 1;

FIG. 4 is a fragmentary sectional view taken from the line 4—4 of FIG. 1;

FIG. 5 is a fragmentary planned view taken from the line 5—5 of FIG. 4;

FIG. 6 is a view similar to FIG. 1 showing a modification of the invention;

FIG. 7 is a fragmentary sectional view taken from the line 7—7 of FIG. 6;

FIG. 8 is a fragmentary sectional view taken from the line 8—8 of FIG. 7; and

FIG. 9 is a fragmentary sectional view taken from the line 9—9 of FIG. 8.

DESCRIPTION OF THE PREFERRED EMBODIMENTS

Figure 1:
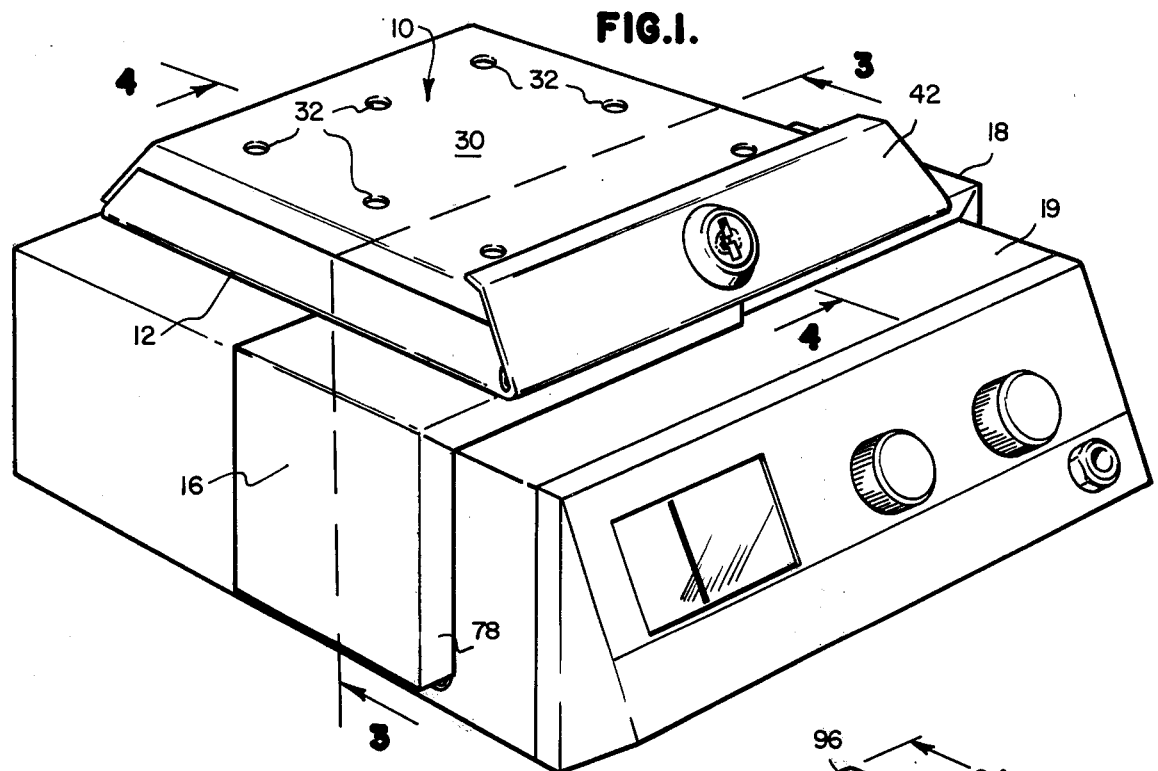
FIG. 1 is a perspective view of a lockable mounting means for removeably supporting electronic accessories in vehicles in accordance with the present invention and showing an electronic accessory secured to said mounting means.

As shown in FIG. 1 of the drawings, the invention comprises a pair of telescopic members 10 and 12 and a pair of bracket assemblies 18 and 16 mounting an electronic accessories housing 19 and wherein the telescopic members 10 and 12 are in locked position relative to each other.

As shown in FIG. 3 of the drawings, a member 20 of a vehicle is disclosed. This member 20 may be the flat surface at the underneath portion of an automobile instrument panel or the like and the telescopic member 10 of the invention is secured to the member 20 by means of fixtures 22 and 24. These fixtures have hexagonal heads 26 and 28 which are on the inner side 30 of the telescopic member 10, all as will be hereinafter described in detail.

It will be seen that the telescopic member 10 is provided with openings 32 through which the fixtures 22 and 24 may be disposed.

The fixtures 22 and 24 are self threading sheet metal screws. However, other fixtures may be used as desired. It will be understood that these sheet metal screws are very difficult to remove when the heads 26 and 28 are enclosed between the telescopic members 10 and 12, which will be hereinafter described.

These telescopic members 10 and 12, as shown in cross section in FIG. 3 of the drawings, are generally frusto pyramidal in their assembled relationship. The telescopic member 10 has downwardly diverging flange portions 34 and 36 which are telescopically slideable between upwardly converging flange portions 38 and 40 of the telescopic member 12. Thus, the telescopic members 10 and 12 have a cross sectional shape when assembled such that they are frusto pyramidal and the telescopic member 12 is provided with an inclined panel 42 which is inclined relative to a base portion 44 thereof. The panel 42 carries a tumbler lock 46 which carries and actuates a locking hook 48, shown best in FIGS. 4 and 5 of the drawings. This locking hook 48 is adapted to be rotated into engagement with a complimental flange structure 50 which projects downward from the horizontal plate portion 30 of the telescopic member 10.

Figure 2:
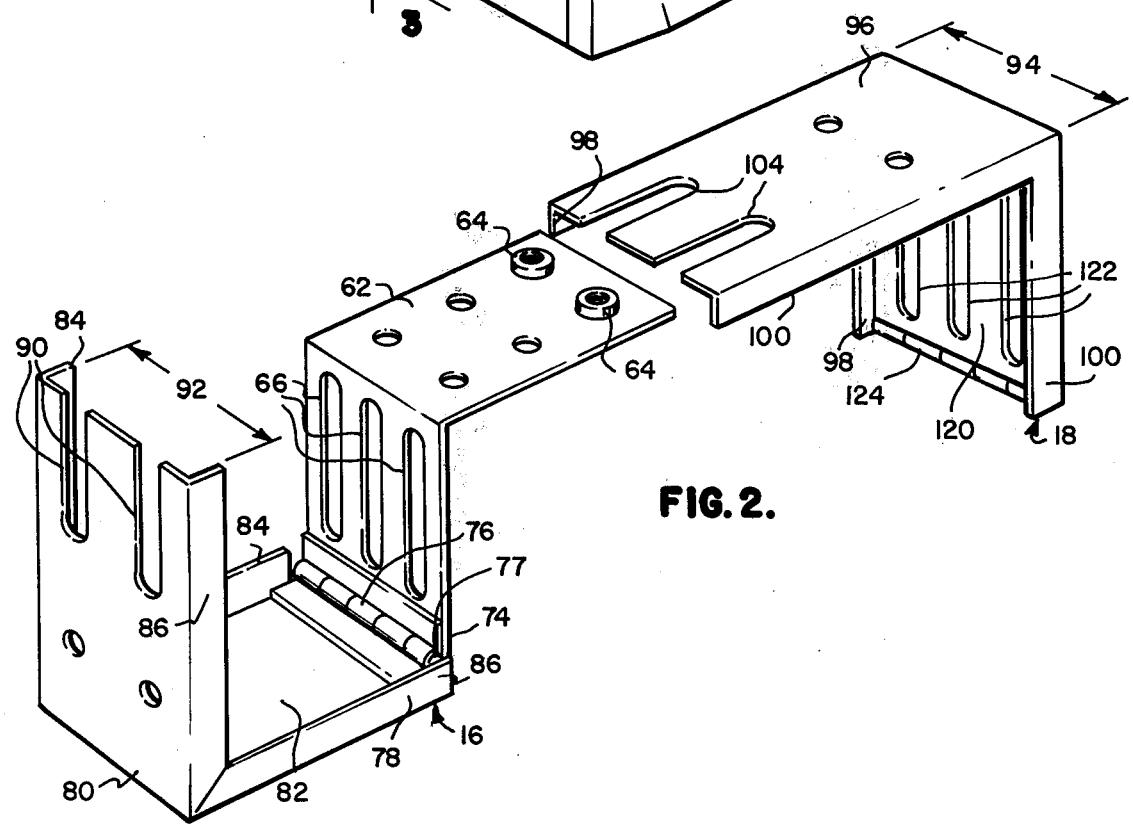
FIG. 2 is a perspective view of arrow shaped bracket assemblies of the invention showing one of them in open position and one of them in closed position.

The hook member 48 may be moved to a broken line position 52 out of interference with the portion 50 of the plate member 30 such as to permit removal of the telescopic member 12 in the direction of an arrow A thereby carrying the housing 18 of the electronic accessory out of the mounted position, as shown in FIGS. 2 and 3 of the drawings, such as to remove it from a vehicle to which the telescopic member 10 is fixed in connection with the aforementioned plate or panel portion 20 of the vehicle.

It will be seen that the front panel 42 of the telescopic member 12 covers the open end of the telescopic member 10 between the flanges 34 and 36 thereof and prevents access to the heads 26 and 28 of the fixtures 22 and 24 and also, this panel 42 prevents access to screwthreaded fixtures 54 and 56 which are provided with heads 58 and 60 disposed at the upper side 63 of the plate portion 44 of the telescopic member 12 and thus, the heads 58 and 60 of the fixtures may not be tampered with when the panel 42 of the telescopic member 12 is in the position as shown in FIGS. 1, 4 and 5 of the drawings.

The fixtures 54 and 56 will be hereinafter described in detail in connection with the holding of the L-shaped bracket assemblies 16 and 18 in connection with the telescopic member 12.

As shown in FIGS. 2 and 3, the L-shaped bracket assemblies 16 and 18 are substantially identical structural mechanisms and, as shown in FIGS. 2 and 3, the L-shaped bracket assembly 16 is provided with a first L-shaped member 62 which is provided with internally screwthreaded fixtures 64 which receive the screwthreaded fixtures 54 as hereinbefore described for holding the respective L-shaped bracket assembly 16 in connection with the telescopic member 12.

The L-shaped member 62 shown in FIGS. 2 and 3 of the drawings is provided with slotted fixture openings 66 through which fixtures 68 may be projected and screwthreaded into respective openings 70 in a side wall portion 72 of the electronic accessory housing 19 so as to secure the L-shaped member 62 rigidly connected to the housing 19.

A normally lower end 74 of the L-shaped member 62 is pivotally secured by means of a hinge 76 to a normally lower end portion 78 of an L-shaped member 80 of the L-shaped bracket assembly 16. This member 80 is channel shaped in cross section and provided with a web portion 82 and a pair of right angled flanges 84 and 86 which cover opposite ends of the hinge 76 and its respective hinge pin 77.

The flanges 84 and 86 also cover the heads 69 of the fixture 68 shown in FIG. 3 of the drawings and thus, the flanges 84 and 86 prevent access to the hinge pin 77 as well as the fixtures 68 at the heads 69 when the L-shaped bracket assemblies are installed as shown in FIGS. 1 and 3 of the drawings wherein the channel shaped member 80 of each L-shaped bracket assembly is hinged over the respective L-shaped member 62 in overlying relationship therewith, as shown in FIGS. 1 and 3 of the drawings.

The fixtures 54 hereinbefore described extending through the telescopic member 12 and the respective L-shaped bracket member 80 and through slotted portions 90 therein completely secure the entire assembly together; namely, the telescopic member 12, together with the L-shaped bracket member 62 and 80 as well as the housing 19 of the respective electronic accessory.

The flanges 84 and 86 of the L-shaped member 80 of the bracket assembly 16 have a dimension 92 which is slightly greater than a corresponding dimension 94 of a channel shaped in cross section L-shaped member 96 of the bracket assembly 18 so that the flanges 84 and 86 may fit over respective flanges 98 and 100 of the L-shaped bracket 96 to allow telescopic adjustment thereof in order to fit accessory housings, the dimension 102 of which may vary.

Accordingly, it will be seen that the flanges 84 and 86 fit over the outsides of the flanges 98 and 100 of the slots 90, hereinbefore described in connection with the L-shaped bracket 82, correspond with respective slots 104 in the L-shaped member 96 so that the fixtures 54 and 56 may extend through corresponding slots 90 and 104 even though the bracket assemblies 16 and 18 may be spaced to fit housings having a varying dimension as indicated at 102 in FIG. 3 of the drawings. Thus, housings of various widths may be readily accommodated by the bracket assemblies 16 and 18.

The fixtures 54 and 56 extend through respective slotted openings 108 and 110 in the plate portion 62 of the telescopic member 12 and these slotted openings 108 and 110 correspond with the slots 90 and 104 of the bracket assemblies 16 and 18 such as to further provide for the adjustability and spaced relationship of the bracket assemblies 16 and 18 relative to the dimension 102 of the electronic accessory housing 19.

By way of example only, internally screwthreaded fixtures 112 and 114 receive the fixtures 54 and 56 and these internally screwthreaded fixtures 112 and 114 are fixed to the L-shaped members 62 and 116, all as shown best in FIG. 3 of the drawings.

As shown in FIG. 2, it will be seen that the bracket assembly 18 is provided with an L-shaped member 120 which is similar to the L-shaped member 62 and this L-shaped member 120 is provided with fixture receiving slots 122 similar to the slots 66 of the L-shaped member 62 and that a hinge 124 is similar to the hinge 76 and hingedly interconnected the L-shaped member 120 with the L-shaped member 96.

In the modification, as shown in FIGS. 6 to 9 inclusive of the drawings, the telescopic members 10 and 12 are similar and the electronic accessories housing 19 is similar.

Secured to the plate portion 44 of the telescopic member 12 by means of a rivot or other fixture 130 is a flexible band 132 which may be made of tough woven metal, but which is sufficiently flexible to be wrapped around the housing 19, as shown best in FIG. 7. The opposite end portion 134 of the flexible band 132 is secured to a mandrel and ratchet means 136, shown best in FIGS. 8 and 9 of the drawings, wherein the end portion 134 is carried in a slot 135 of a rotary mandrel 138 and is adapted to be wound therearound by means of a wrench disposable in a hexagonal socket 140 of the mandrel 138. This mandrel 138 is rotatably carried in bracket portions 142 which are spaced apart a sufficient distance to receive the flexible band 132 therebetween. Fixed to an end portion of the mandrel 138 is a ratchet wheel 144 having butress teeth 146 engageable by a resilient pawl 148 secured by means of a rivot or other fixture 150 to the plate portion 62 of the telescopic member 12.

When an allen wrench or other hexagonal in cross section wrench is fitted in the socket 140 and turned in a clockwise direction as shown in FIG. 9 of the drawings, the ratchet teeth or abutment portions 146 pass beyond the end of the resilient pawl 148 and hold the band 132 in tension.

The band 132 extends through respective openings 150 and 152 in the telescopic member 12 adjacent to the respective flanges 38 and 40, hereinbefore described.

Inasmuch as the band 132 is of very hard flexible material, such as woven stainless steel or the like, and inasmuch as it is very tightly wound around the housing 19, it is very difficult to cut or remove and therefore quite secure.

It will be obvious to those skilled in the art that various modifications may be resorted to without departing from the spirit of the invention.

I claim:

1. A lockable mounting means for removeably supporting electronic accessories in vehicles comprising: a pair of telescopic members; one of said members slideably moveable within the other along a first axis; key operated locking means disposed to removeably lock and hold said members one within the other; one of said members adapted to be fixed in a vehicle; the other of said telescopic members being a removeably support for an electronic accessory; connector means for connecting said accessory to said other member; said connector means having a pair of first L-shaped members adapted to be secured contiguously around a corner of a generally rectangular accessory housing, such that said first L-shaped members are generally opposed to each other and disposed around opposite corners of said housing; a pair of second L-shaped members; hinge means coupling each one of said second L-shaped members to each of said first L-shaped members such as to nest therewith at an opposite side thereof with respect to the side of said first L-shaped member which is contiguous with said housing; first fixtures adapted for securing said first L-shaped members to said housing; said first fixtures covered by said second L-shaped members; and second fixtures adapted for securing said second L-shaped members to said other one of said telescopic members.

2. The invention as defined in claim 1, wherein: said key operated locking means is carried by said other one of said telescopic members.

3. The invention as defined in claim 1, wherein: the cross section of said telescopic members being generally frusto pyramidal; said other one of said telescopic members having a face plate portion covering the cross section of said telescopic members and thereby preventing access to said second fixtures.

4. The invention as defined in claim 3, wherein: said key operated locking means carried by said face plate portion of said other one of said telescopic members.

5. The invention as defined in claim 1, wherein: said second L-shaped members are provided with overlapping portions which may overlap each other to allow for the fitting of a variety of housings having different dimensions; said overlapping portions each having elongated openings which align with each other so as to accommodate said second fixtures.

6. The invention as defined in claim 5, wherein: said first L-shaped members are provided with internally screwthreaded nuts fixed thereto and aligned with said elongated openings; said nuts adapted to recieve bolts; bolts extending through said other telescopic member and through said elongated openings and into said nuts; said bolts and nuts constituting said second fixtures.

7. The invention as defined in claim 6, wherein: the cross section of said telescopic members being generally frusto pyramidal; said other one of said telescopic members having a face plate portion covering the cross section of said telescopic members and thereby preventing access to said second fixtures.

8. The invention as defined in claim 1, wherein: said second L-shaped members are generally channel shaped and provided with a web portion and a pair of integral flanges; said flanges being adjacent to said first L-shaped members; said first fixtures comprising bolts extending through said first L-shaped members and into said housing; said first fixtures being screwthreaded members and having heads disposed between said flanges and covered by said web portion of said second L-shaped members.

9. The invention as defined in claim 2, wherein: said locking means is provided with a key operated tumbler assembly; a hook coupled to said tumbler assembly; said one of said telescopic members which is fixed to a vehicle having a ledge engageable by said hook.

10. The invention as defined in claim 9, wherein: said other one of said telescopic members having a face plate portion covering the cross section of said telescopic members and thereby preventing access to said second fixtures; said key operated locking means carried by said face plate of said other telescopic member.

11. The invention as defined in claim 9, wherein: the cross section of said telescopic members being generally frusto pyramidal; said other one of said telescopic members having a face plate portion covering the cross section of said telescopic members thereby preventing access to said second fixtures; said key operated locking means carried by said face plate portion of said other one of said telescopic members.

12. The invention as defined in claim 8, wherein: said hinge means is provided with opposite ends disposed adjacent to and covered by said flanges.

* * * * *